United States Patent
Xiao

(10) Patent No.: US 12,348,878 B2
(45) Date of Patent: Jul. 1, 2025

(54) PHOTOGRAPHING METHOD, APPARATUS, AND ELECTRONIC DEVICE FOR QUICK AND CONTINUOUS PHOTOGRAPHING

(71) Applicant: VIVO MOBILE COMMUNICATION CO., LTD., Dongguan (CN)

(72) Inventor: Xu Xiao, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 119 days.

(21) Appl. No.: 18/139,930

(22) Filed: Apr. 26, 2023

(65) Prior Publication Data
US 2024/0080572 A1 Mar. 7, 2024

Related U.S. Application Data

(63) Continuation of application No. PCT/CN2021/126686, filed on Oct. 27, 2021.

(30) Foreign Application Priority Data

Oct. 30, 2020 (CN) .......................... 202011188845.X

(51) Int. Cl.
*H04N 23/80* (2023.01)
*H04N 19/42* (2014.01)

(52) U.S. Cl.
CPC ............. *H04N 23/80* (2023.01); *H04N 19/42* (2014.11)

(58) Field of Classification Search
CPC ...... H04N 23/80; H04N 19/42; H04N 23/665; H04N 23/70; H04N 23/81; H04N 5/268; H04N 23/617
See application file for complete search history.

(56) References Cited

U.S. PATENT DOCUMENTS 11,328,449 B2* 5/2022 Li .............................. G06T 5/50
2008/0273097 A1* 11/2008 Nagashima .......... H04N 23/611
382/118

(Continued)

FOREIGN PATENT DOCUMENTS

CN 103297680 A 9/2013
CN 105120112 A 12/2015

(Continued)

OTHER PUBLICATIONS

Extended European Search Report issued in related European Application No. 21885206.9, mailed Mar. 25, 2024, 10 pages.

(Continued)

*Primary Examiner* — Ahmed A Berhan
(74) *Attorney, Agent, or Firm* — IPX PLLC

(57) ABSTRACT

A photographing method and an electronic device are provided. The method includes: receiving a first input; starting first photographing in response to the first input; receiving a second input; and in response to the second input, starting second photographing in a case that it is determined that a photographing application obtains target image data of the first photographing from an operating system, and processing the target image data by using a first preset algorithm, to obtain a first processing result. The target image data is initial image data outputted through a sensor of a camera, or target image data is image data outputted after format conversion is performed on the initial image data. The first preset algorithm is an algorithm corresponding to the target image data. The method further includes performing encoding based on the first processing result to obtain a first photographic image.

12 Claims, 5 Drawing Sheets

(56) References Cited

U.S. PATENT DOCUMENTS

2010/0026843 A1  2/2010 Tezuka et al.
2013/0208143 A1  8/2013 Chou et al.
2020/0327698 A1  10/2020 Li

FOREIGN PATENT DOCUMENTS

| CN | 105763813 A | | 7/2016 |
| CN | 106127698 A | | 11/2016 |
| CN | 106331491 A | | 1/2017 |
| CN | 107979725 A | | 5/2018 |
| CN | 108012084 A | | 5/2018 |
| CN | 107222669 B | | 1/2019 |
| CN | 109922322 A | | 6/2019 |
| CN | 110086967 A | | 8/2019 |
| CN | 110121022 A | | 8/2019 |
| CN | 110969587 A | | 4/2020 |
| CN | 112291475 A | | 1/2021 |
| JP | 2014150313 A | * | 8/2014 |

OTHER PUBLICATIONS

International Search Report issued in corresponding International Application No. PCT/CN2021/126686, mailed Jan. 14, 2022, 5 pages.
First Office Action issued in related Chinese Application No. 202011188845.X, mailed Aug. 9, 2021, 9 pages.

* cited by examiner

PHOTOGRAPHING METHOD, APPARATUS, AND ELECTRONIC DEVICE FOR QUICK AND CONTINUOUS PHOTOGRAPHING

CROSS-REFERENCE TO RELATED APPLICATION

This application is a continuation of International Application No. PCT/CN2021/126686, filed on Oct. 27, 2021, which claims priority to Chinese Patent Application No. 202011188845.X, filed on Oct. 30, 2020. The entire contents of each of the above-referenced applications are expressly incorporated herein by reference.

TECHNICAL FIELD

This application relates to the field of communication technologies, and in particular, to a photographing method and apparatus, and an electronic device.

BACKGROUND

With the wider application of electronic devices, a camera installed on an electronic device can usually replace the role of a conventional camera or even a single-lens reflex camera. Therefore, a photographing function of the electronic device is more widely applied. Currently, after receiving a tapping operation for photographing, the electronic device needs to wait for a photographic image to be encoded before performing next photographing. As a result, it is possible to miss capturing a to-be-photographed picture, which causes a poor photographing effect.

SUMMARY

Embodiments of this application provide a photographing method and apparatus, and an electronic device.

The present application is implemented as follows:

According to a first aspect, an embodiment of this application provides a photographing method, the method including:

receiving a first input;

starting first photographing in response to the first input;

receiving a second input;

in response to the second input, starting second photographing in a case that it is determined that a photographing application obtains target image data of the first photographing from an operating system, and processing the target image data by using a first preset algorithm, to obtain a first processing result, where the target image data is initial image data outputted through a sensor of a camera, or is image data outputted after format conversion is performed on the initial image data, and the first preset algorithm is an algorithm corresponding to the target image data; and performing encoding based on the first processing result to obtain a first photographic image.

According to a second aspect, an embodiment of this application provides a photographing apparatus, the apparatus including:

a first receiving module, configured to receive a first input;

a starting module, configured to start first photographing in response to the first input;

a second receiving module, configured to receive a second input;

a first processing module, configured to, in response to the second input, start second photographing in a case that it is determined that a photographing application obtains target image data of the first photographing from an operating system, and process the target image data by using a first preset algorithm, to obtain a first processing result, where the target image data is initial image data outputted through a sensor of a camera, or is image data outputted after format conversion is performed on the initial image data, and the first preset algorithm is an algorithm corresponding to the target image data; and a first encoding module, configured to perform encoding based on the first processing result to obtain a first photographic image.

According to a third aspect, an embodiment of this application provides an electronic device, including a processor, a memory, and a program or an instruction stored on the memory and executable on the processor, where the program or the instruction, when executed by the processor, implements steps in the photographing method according to the first aspect.

According to a fourth aspect, an embodiment of this application provides a readable storage medium, storing a program or an instruction, where the program or the instruction, when executed by a processor, implements steps in the photographing method according to the first aspect.

According to a fifth aspect, an embodiment of this application provides a chip, including a processor and a communication interface, where the communication interface is coupled to the processor, and the processor is configured to execute a program or an instruction to implement the method according to the first aspect.

According to a sixth aspect, a computer program product is provided, where the computer program product is stored in a non-volatile storage medium, and executed by at least one processor to implement steps of the method according to the first aspect.

In the embodiments of this application, a first input is received; first photographing is started in response to the first input, a second input is received; in response to the second input, second photographing is started in a case that it is determined that a photographing application obtains target image data of the first photographing from an operating system, and the target image data is processed by using a first preset algorithm, to obtain a first processing result, where the target image data is initial image data outputted through a sensor of a camera, or is image data outputted after format conversion is performed on the initial image data, and the first preset algorithm is an algorithm corresponding to the target image data; and encoding is performed based on the first processing result to obtain a first photographic image. In this way, during photographing, next photographing can be performed after the target image data is obtained. There is no need to wait for the photographic image to be encoded before performing next photographing, thereby reducing the possibility of missing capturing a to-be-photographed picture, and improving the photographing effect.

DETAILED DESCRIPTION

The following describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The specification and claims of this application, and terms "first" and "second" are used to distinguish similar objects, but are not used to describe a specific sequence or order. It should be understood that the data used in such a way is interchangeable in an appropriate situation, so that the embodiments of this application can be implemented in an order other than those illustrated or described herein. Objects distinguished by using "first", "second", and the like usually belong to the same category and the quantity of the objects is not limited. For example, there may be one or more first objects. In addition, "and/or" in this specification and the claims represents at least one of the connected objects, and the character "/" generally indicates an "or" relationship between the associated objects.

A photographing method provided in the embodiments of this application is described in detail below with reference to the accompanying drawings by using specific embodiments and application scenarios thereof.

Figure 1:
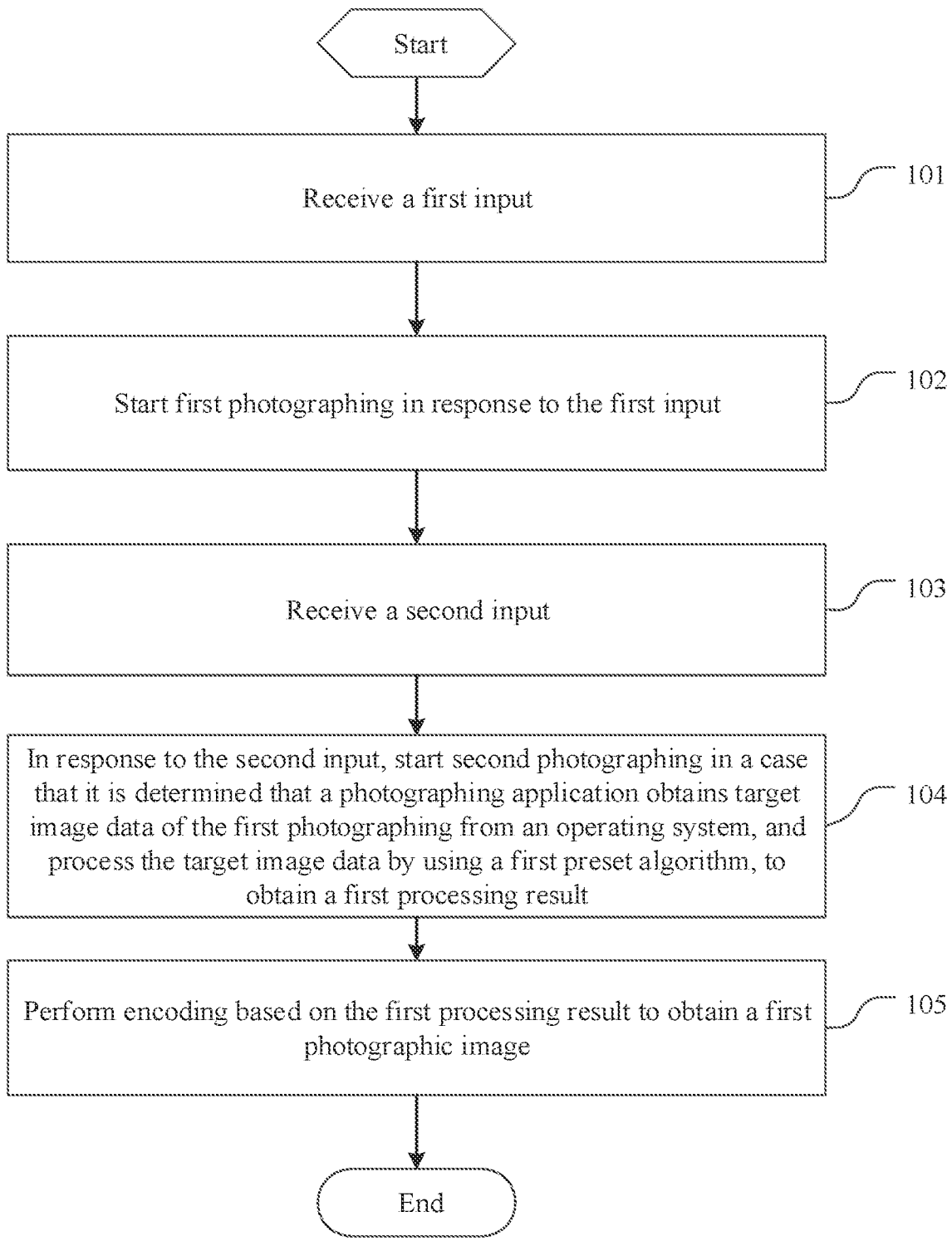
FIG. 1 is a flowchart of a photographing method according to an embodiment of this application.

FIG. 1 is a flowchart of a photographing method according to an embodiment of this application. As shown in FIG. 1, the method includes the following steps:

Step 101. Receive a first input.

The first input may be an operation of tapping a shutter button; or may be an operation of tapping a preset button for photographing; or may be an operation of sliding according to a preset gesture for photographing, or the like. The first input is not limited in this embodiment.

Step 102. Start first photographing in response to the first input.

The first photographing may be any photographing after a photographing application is started.

Step 103: Receive a second input.

The second input may be an operation of tapping the shutter button; or may be an operation of tapping a preset button for photographing; or may be an operation of sliding according to a preset gesture for photographing, or the like. The second input is not limited in this embodiment.

Step 104. In response to the second input, start second photographing in a case that it is determined that a photographing application obtains target image data of the first photographing from an operating system, and process the target image data by using a first preset algorithm, to obtain a first processing result, where the target image data is initial image data outputted through a sensor of a camera, or is image data outputted after format conversion is performed on the initial image data, and the first preset algorithm is an algorithm corresponding to the target image data.

The target image data may be initial image data in a Raw format outputted by the sensor of the camera, or may be image data in a Yuv format outputted after format conversion is performed on the initial image data in the Raw format. For example, the target image data may be image data in the Yuv format outputted after format conversion is performed on the initial image data in the Raw format by using an Image Signal Processing (ISP) chip.

In addition, the first preset algorithm may be a multi-frame noise reduction algorithm. In a case that the target image data is the image data outputted after format conversion is performed on the initial image data, the first preset algorithm may be a Yuv domain algorithm, such as a Yuv domain multi-frame noise reduction algorithm. The Yuv domain algorithm may combine a plurality of frames of image data in a Yuv format and output one frame of image data in the Yuv format. In a case that the target image data is the initial image data outputted through the sensor of the camera, the first preset algorithm may be a Raw domain algorithm, such as, a Raw domain multi-frame noise reduction algorithm. The Raw domain algorithm may combine a plurality of frames of image data in a Raw format and output one frame of image data in the Raw format.

Further, the target image data may be processed by using the first preset algorithm in the background to obtain the first processing result. An example in which the target image data is image data in a Yuv format is used. The first preset algorithm may be the Yuv domain multi-frame noise reduction algorithm, and the first processing result may be image data in the Yuv format after noise reduction is performed by using the Yuv domain multi-frame noise reduction algorithm.

Step 105. Perform encoding based on the first processing result to obtain a first photographic image.

Software encoding may be performed based on the first processing result in the background to obtain the first photographic image; or through a reprocess mechanism, the first processing result may be inputted into a hardware module configured for Jpeg encoding to perform hardware encoding, to obtain the first photographic image.

An example in which photographing is performed by using a photographing application on an electronic device is used. When a user taps for photographing, the photographing application sends a photographing request to perform photographing. In the related art, the photographing application can allow next photographing only after obtaining a final photographic image of the last photographing request. For example, the photographing application can allow next photographing only after obtaining a Jpeg image of the last photographing request. However, generating the photographic image of the last photographing request is time-consuming. First, format conversion needs to be performed on initial image data, then image data obtained after format conversion is processed by using a noise reduction algorithm, and then the processed image data is encoded, to obtain the final photographic image of the last photographing request. In this embodiment, if target image data of the last photographing is obtained, photographing may be allowed to start, which can satisfy the requirement that the user expects for quick photographing.

An example in which the final photographic image is a Jpeg image is used. In the related art, during first photographing, initial image data in a Raw format needs to be converted into image data in a Yuv format first, then noise reduction is performed on the image data in the Yuv format by using a Yuv domain multi-frame noise reduction algorithm, and then Jpeg encoding is performed on the image data after noise reduction, to obtain a Jpeg image of the first photographing. When a processor of the electronic device performs noise reduction on the image data in the Yuv format by using the Yuv domain multi-frame noise reduction algorithm, it is time-consuming, and several seconds may be needed. Therefore, in the related art, the user is allowed to tap for next photographing only several seconds later, causing a poor user experience. In this embodiment, in a case that the initial image data in the Raw format or the image data in the Yuv format of the first photographing is obtained, the user can start the second photographing. Therefore, even if Yuv domain multi-frame noise reduction is time-consuming, the user can continuously tap for photographing, which can improve photographing experience of the user.

To obtain better photographing experience, with the development of artificial intelligence technologies, the photographing application may further upload image data in a Raw format to the cloud, and an artificial intelligence algorithm on the cloud processes the image data in the Raw format, to obtain a photographic image and returns the photographic image to the photographing application. The photographing application may start next photographing after obtaining the initial image data in the Raw format outputted by the sensor of the camera.

In this embodiment of this application, a first input is received; first photographing is started in response to the first input; a second input is received; in response to the second input, second photographing is started in a case that it is determined that a photographing application obtains target image data of the first photographing from an operating system, and the target image data is processed by using a first preset algorithm, to obtain a first processing result; and encoding is performed based on the first processing result to obtain a first photographic image. In this way, during photographing, next photographing can be performed after the target image data is obtained. There is no need to wait for the photographic image to be encoded before performing next photographing, thereby reducing the possibility of missing capturing a to-be-photographed picture, and improving the photographing effect.

In some embodiments, after the starting first photographing, the method further includes:
   determining whether the first preset algorithm needs to be used in a process of obtaining a final photographic image; and
   the starting second photographing in a case that it is determined that a photographing application obtains target image data of the first photographing from an operating system, and processing the target image data by using a first preset algorithm includes:
   in a case that the first preset algorithm needs to be used in the process of obtaining the final photographic image, starting the second photographing in a case that it is determined that the photographing application obtains the target image data of the first photographing from the operating system, and processing the target image data by using the first preset algorithm.

The final photographic image may be used as a photographing result of the first photographing, and after obtaining the final photographic image, the first photographing is over. The final photographic image may be an encoded photographic image, for example, may be the first photographic image. During actual photographing, the final photographic image may be a Jpeg image.

In addition, usually, in a night scene or a dark scene, processing image data by using a multi-frame noise reduction algorithm can reduce noise of the image. By determining whether a photographing environment of the first photographing is in a night scene or a dark scene, whether the first preset algorithm needs to be used in the process of obtaining the final photographic image may be determined; or by determining whether the user chooses a photographing mode in a night scene or a dark scene, whether the first preset algorithm needs to be used in the process of obtaining the final photographic image may be determined.

For example, the target image data may be image data in a Yuv format, and the first preset algorithm may be a Yuv domain multi-frame noise reduction algorithm. In a case that the image data in the Yuv format needs to be processed by using the Yuv domain multi-frame noise reduction algorithm in the process of obtaining the final photographic image, the second photographing may be allowed to start if the image data in the Yuv format of the first photographing is obtained.

It should be noted that, in a case that the target image data is image data in a Raw format, if the image data in the Raw format does not need to be processed by using a Raw domain algorithm in the process of obtaining the final photographic image, the photographing application may input, through the Reprocess mechanism, initial image data in a Raw format into the ISP chip for further processing, and the ISP chip may perform format conversion on the initial image data in the Raw format and then output image data in a Yuv format. The photographing application may obtain the image data in the Yuv format from the ISP chip, and perform software encoding on the image data in the Yuv format to obtain the final photographic image.

Further, after obtaining the image data in the Yuv format, the photographing application may determine whether the image data in the Yuv format needs to be processed by using the Yuv domain multi-frame noise reduction algorithm. In a case that the image data in the Yuv format needs to be processed by using the Yuv domain multi-frame noise reduction algorithm, the image data in the Yuv format may be processed by using the Yuv domain multi-frame noise reduction algorithm, and software encoding may be performed on processed image data in the Yuv format, to obtain the final photographic image. In a case that the image data in the Yuv format does not need to be processed by using the Yuv domain multi-frame noise reduction algorithm, software encoding may be performed on the image data in the Yuv format to obtain the final photographic image.

In this implementation, in a case that the first preset algorithm needs to be used in the process of obtaining the final photographic image, the second photographing is started in a case that it is determined that the photographing application obtains the target image data of the first photographing from the operating system, and the target image data is processed by using the first preset algorithm. In this way, there is no need to wait for the target image data to be processed before starting the second photographing, thereby increasing the photographing speed.

In some embodiments, after the determining whether the first preset algorithm needs to be used in a process of obtaining a final photographic image, the method further includes:
   in a case that the first preset algorithm does not need to be used in the process of obtaining the final photographic image, starting the second photographing in a case that it is determined that the photographing application obtains a second photographic image of the first photographing from the operating system, where the second photographic image is an image obtained by encoding the target image data.

For example, the second photographic image may be a Jpeg image, and may be obtained by performing Jpeg encoding on the target image data. The second photographic image may be used as the final photographic image of the first photographing.

An example in which the target image data is image data in a Yuv format is used. The first preset algorithm may be a Yuv domain multi-frame noise reduction algorithm. In a case that the image data in the Yuv format does not need to be processed by using the Yuv domain multi-frame noise reduction algorithm in the process of obtaining the final photographic image, the second photographing may be allowed to start in a case that it is determined that the photographing application obtains the Jpeg image of the first photographing from the operating system. In this way, the Jpeg image of the first photographing may be obtained through hardware encoding, thereby maintaining the normal photographing process. In a case that the image data in the Yuv format does not need to be processed by using the Yuv domain multi-frame noise reduction algorithm in the process of obtaining the final photographic image, the Jpeg image of the first photographing is quickly obtained, thereby implementing quick and continuous photographing.

In this implementation, in a case that the target image data does not need to be processed by using the first preset algorithm, the second photographing is started in a case that it is determined that the photographing application obtains the second photographic image of the first photographing from the operating system. In this way, in a case that the target image data does not need to be processed by using the first preset algorithm, the final photographic image can be obtained through hardware encoding. Compared with software encoding, hardware encoding can increase the encoding speed, thereby increasing the photographing speed.

In some embodiments, the target image data is the initial image data outputted through the sensor of the camera, and after the starting second photographing, the performing encoding based on the first processing result to obtain a first photographic image includes:

inputting the first processing result into a graphics processing unit to obtain image data outputted by the graphics processing unit; and performing encoding based on the image data outputted by the graphics processing unit to obtain the first photographic image.

The target image data may be initial image data in a Raw format outputted by the sensor of the camera, and the graphics processing unit may be an ISP chip. The inputting the first processing result into a graphics processing unit may be inputting the first processing result into the graphics processing unit through the Reprocess mechanism. Generally, an application is supported in requesting data from underlying hardware. For example, during photographing, the photographing application sends a photographing request to the underlying hardware to obtain a photographic image. The Reprocess mechanism allows the application to transfer data to the underlying hardware, and the underlying hardware further processes the data. The underlying hardware may include hardware such as the graphics processing unit.

For example, the target image data is initial image data in a Raw format, and after receiving a photographing request of the user, the photographing application may directly request the initial image data in the Raw format from the underlying hardware through the operating system. After the initial image data in the Raw format is obtained, next photographing may be started. Through the Reprocess mechanism, the initial image data in the Raw format may be used as input data and inputted into the ISP chip for further processing. Format conversion is performed on the initial image data in the Raw format and then image data in a Yuv format is outputted.

In this implementation, the target image data is the initial image data outputted through the sensor of the camera, which saves time consumed by the graphics processing unit in processing the initial image data, thereby implementing continuous photographing more quickly. Moreover, the first processing result is inputted into the graphics processing unit to obtain image data outputted by the graphics processing unit. Encoding is performed based on the image data outputted by the graphics processing unit to obtain the first photographic image. The first processing result can be processed through hardware, thereby implementing quick photographing performance and a good user experience.

In some embodiments, the target image data is the image data outputted after the format conversion is performed on the initial image data, and after the starting first photographing and before the determining whether the first preset algorithm needs to be used in a process of obtaining a final photographic image, the method further includes:

determining whether a second preset algorithm needs to be used in the process of obtaining the final photographic image;

in a case that the second preset algorithm needs to be used in the process of obtaining the final photographic image, starting the second photographing in a case that it is determined that the photographing application obtains the initial image data from the operating system, and processing the initial image data by using the second preset algorithm, to obtain a second processing result;

performing format conversion on the second processing result to obtain second image data; and performing encoding based on the second image data to obtain a third photographic image; and the determining whether the first preset algorithm needs to be used in a process of obtaining a final photographic image includes:

determining whether the first preset algorithm needs to be used in the process of obtaining the final photographic image in a case that the second preset algorithm does not need to be used in the process of obtaining the final photographic image.

The second preset algorithm may be a Raw domain algorithm. Whether the second preset algorithm needs to be used in the process of obtaining the final photographic image may be determined through a photographing environment or a photographing mode chosen by the user. The first preset algorithm may be a Yuv domain algorithm. The initial image data may be image data in a Raw format, the second processing result may be image data in the Raw format processed by using the Raw domain algorithm, and the second image data may be image data in a Yuv format. The performing encoding based on the second image data may be performing software encoding based on the second image data in the background to obtain the third photographic image; or may be inputting, through the Reprocess mechanism, the second image data into a hardware module configured to perform encoding, to perform hardware encoding to obtain the third photographic image. The third photographic image may be a Jpeg image, and may be used as the final photographic image of the first photographing.

In this implementation, whether the second preset algorithm needs to be used in the process of obtaining the final photographic image and whether the first preset algorithm needs to be used in the process of obtaining the final photographic image are determined. In this way, when the second preset algorithm needs to be used, the photographing application can allow the second photographing to start upon obtaining the initial image data. When the second preset algorithm does not need to be used, if the first preset algorithm needs to be used, the photographing application can allow the second photographing to start upon obtaining image data outputted after format conversion. Through two times of determining, quick photographing performance can be implemented as much as possible, and a good user experience is provided.

It should be noted that, in the photographing method provided in the embodiments of this application, an execution body may be a photographing apparatus, or a control module configured to perform and load the photographing method in the photographing apparatus. In the embodiments of this application, an example in which the photographing apparatus performs and loads the photographing method is used to describe the photographing apparatus provided in the embodiments of this application.

Figure 2:
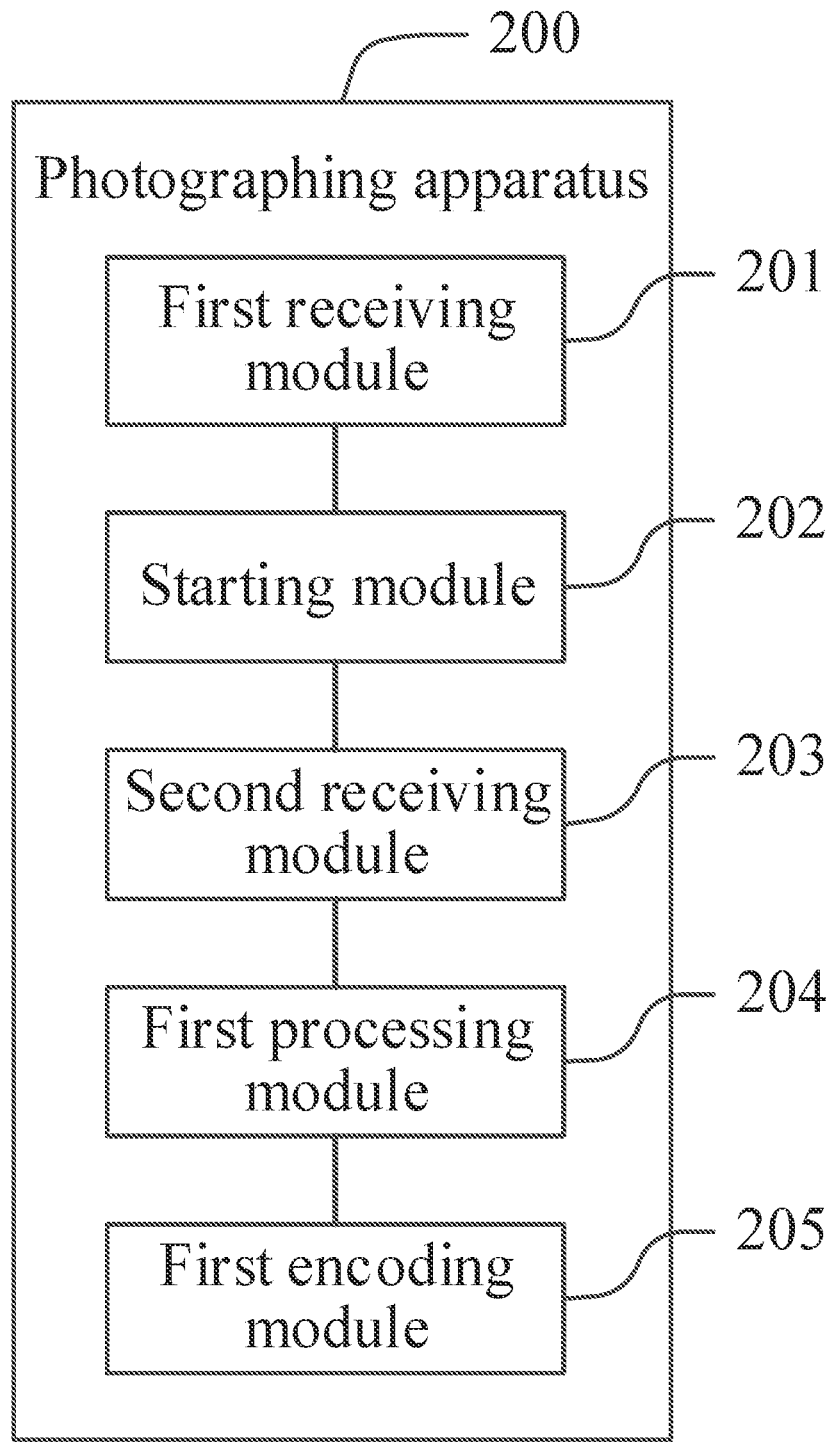
FIG. 2 is a first schematic structural diagram of a photographing apparatus according to an embodiment of this application.

FIG. 2 is a schematic structural diagram of a photographing apparatus according to an embodiment of this application. As shown in FIG. 2, the apparatus 200 includes:
- a first receiving module 201, configured to receive a first input;
- a starting module 202, configured to start first photographing in response to the first input;
- a second receiving module 203, configured to receive a second input;
- a first processing module 204, configured to, in response to the second input, start second photographing in a case that it is determined that a photographing application obtains target image data of the first photographing from an operating system, and process the target image data by using a first preset algorithm, to obtain a first processing result, where the target image data is initial image data outputted through a sensor of a camera, or is image data outputted after format conversion is performed on the initial image data, and the first preset algorithm is an algorithm corresponding to the target image data; and
- a first encoding module 205, configured to perform encoding based on the first processing result to obtain a first photographic image.

In this embodiment of this application, the first receiving module receives a first input; the starting module starts first photographing in response to the first input; the second receiving module receives a second input; the first processing module, in response to the second input, starts second photographing in a case that it is determined that a photographing application obtains target image data of the first photographing from an operating system, and processes the target image data by using a first preset algorithm, to obtain a first processing result, where the target image data is initial image data outputted through a sensor of a camera, or is image data outputted after format conversion is performed on the initial image data, and the first preset algorithm is an algorithm corresponding to the target image data; and the first encoding module performs encoding based on the first processing result to obtain a first photographic image. In this way, during photographing, next photographing can be performed after the target image data is obtained. There is no need to wait for the photographic image to be encoded before performing next photographing, thereby reducing the possibility of missing capturing a to-be-photographed picture, and improving the photographing effect.

Figure 3:
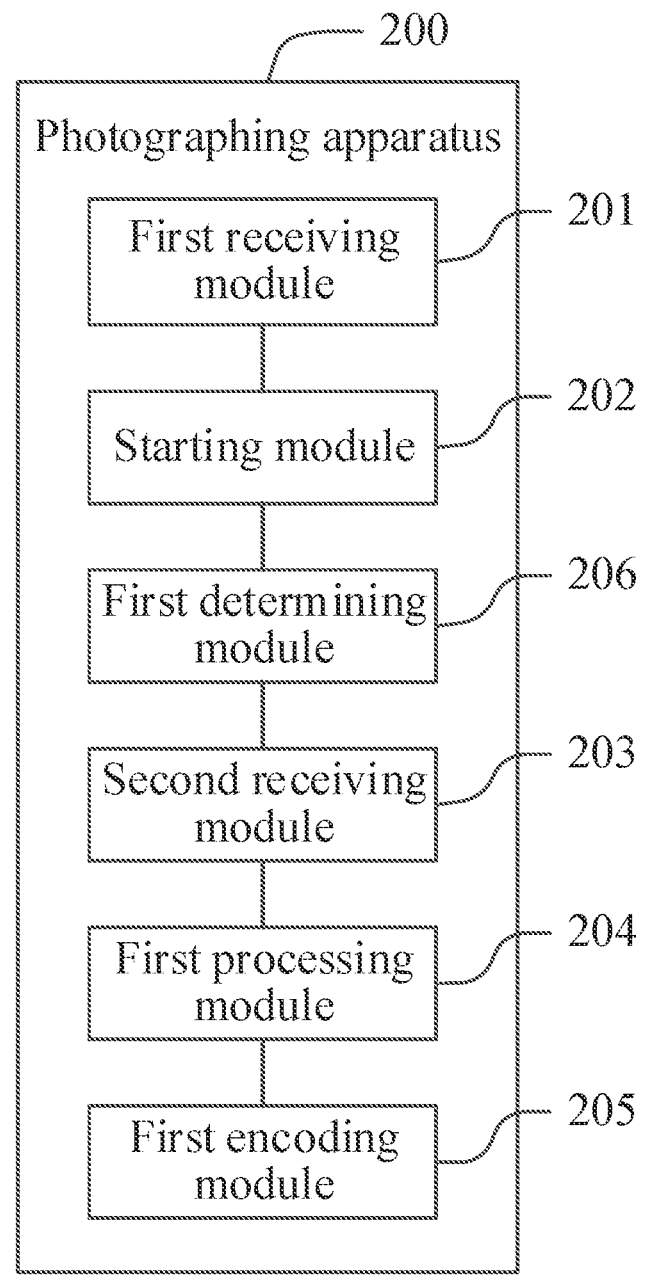
FIG. 3 is a second schematic structural diagram of a photographing apparatus according to an embodiment of this application.

In some embodiments, as shown in FIG. 3, the apparatus 200 further includes:
- a first determining module 206, configured to determine whether the first preset algorithm needs to be used in a process of obtaining a final photographic image; and
the first processing module 204 is configured to:
- in a case that the first preset algorithm needs to be used in the process of obtaining the final photographic image, start the second photographing in a case that it is determined that the photographing application obtains the target image data of the first photographing from the operating system, and process the target image data by using the first preset algorithm.

In some embodiments, the first processing module 204 is further configured to:
- in a case that the first preset algorithm does not need to be used in the process of obtaining the final photographic image, start the second photographing in a case that it is determined that the photographing application obtains a second photographic image of the first photographing from the operating system, where
the second photographic image is an image obtained by encoding the target image data.

In some embodiments, the first encoding module 205 is configured to:
- input the first processing result into a graphics processing unit to obtain image data outputted by the graphics processing unit; and
- perform encoding based on the image data outputted by the graphics processing unit to obtain the first photographic image.

Figure 4:
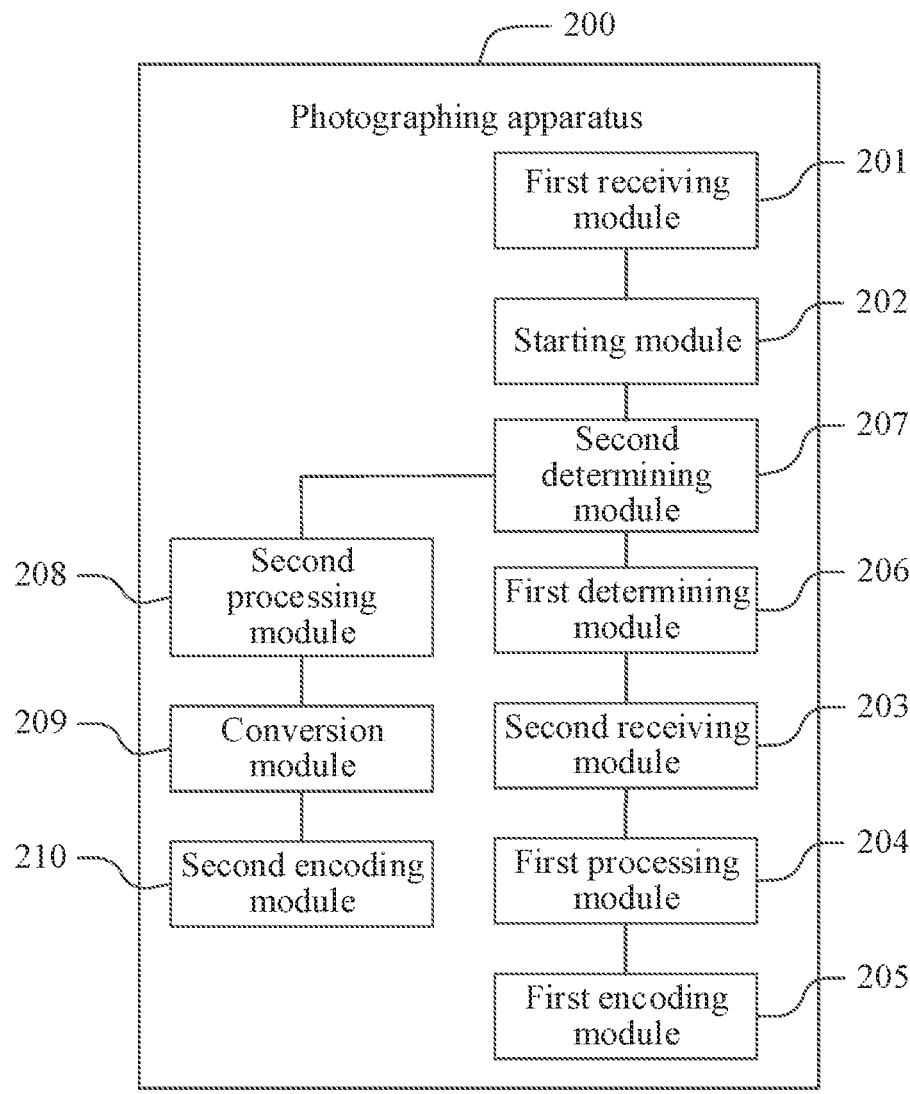
FIG. 4 is a third schematic structural diagram of a photographing apparatus according to an embodiment of this application.

In some embodiments, as shown in FIG. 4, the apparatus 200 further includes:
- a second determining module 207, configured to determine whether a second preset algorithm needs to be used in the process of obtaining the final photographic image;
- a second processing module 208, configured to, in a case that the second preset algorithm needs to be used in the process of obtaining the final photographic image, start the second photographing in a case that it is determined that the photographing application obtains the initial image data from the operating system, and process the initial image data by using the second preset algorithm, to obtain a second processing result;
- a conversion module 209, configured to perform format conversion on the second processing result to obtain second image data; and
- a second encoding module 210, configured to perform encoding based on the second image data to obtain a third photographic image, where
the first determining module 206 is configured to:
- determine whether the first preset algorithm needs to be used in the process of obtaining the final photographic image in a case that the second preset algorithm does not need to be used in the process of obtaining the final photographic image.

The photographing apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palm computer, an in-vehicle electronic device, a wearable device, an Ultra-Mobile Personal Computer (UMPC), a netbook, or a Personal Digital Assistant (PDA); and the non-mobile electronic device may be a server, a Network Attached Storage (NAS), a Personal Computer (PC), a Television (TV), a teller machine, or a self-service machine, which are not specifically limited in the embodiments of this application.

The photographing apparatus in this embodiment of this application may be an apparatus with an operating system. The operating system may be an Android operating system, may be an iOS operating system, or may be another possible operating system, which is not specifically limited in the embodiments of this application.

The photographing apparatus provided in this embodiment of this application can implement the processes implemented in the method embodiment in FIG. 1. To avoid repetition, details are not described herein again.

Figure 5:
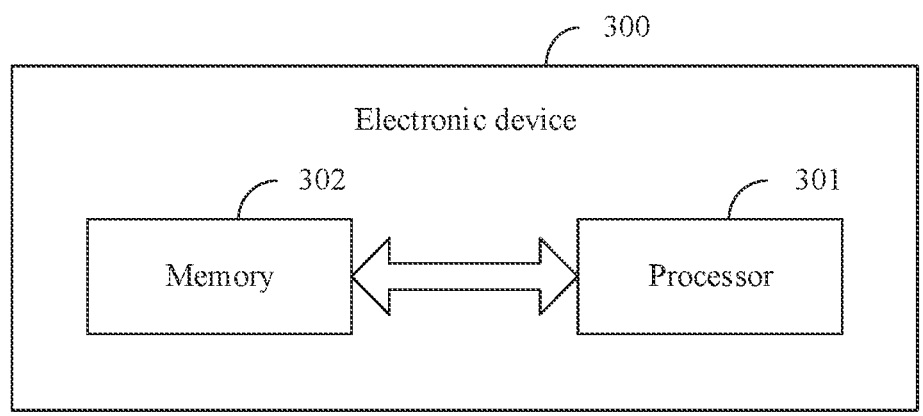
FIG. 5 is a first schematic structural diagram of an electronic device according to an embodiment of this application.

In some embodiments, as shown in FIG. 5, an embodiment of this application further provides an electronic device 300, including a processor 301, a memory 302, and a program or an instruction stored on the memory 302 and executable on the processor 301, where the program or the instruction, when executed by the processor 301, implements the processes of the foregoing photographing method embodiment, and can achieve the same technical effects. To avoid repetition, details are not described herein again.

It should be noted that, the electronic device in this embodiment of this application includes the foregoing mobile electronic device and non-mobile electronic device.

Figure 6:
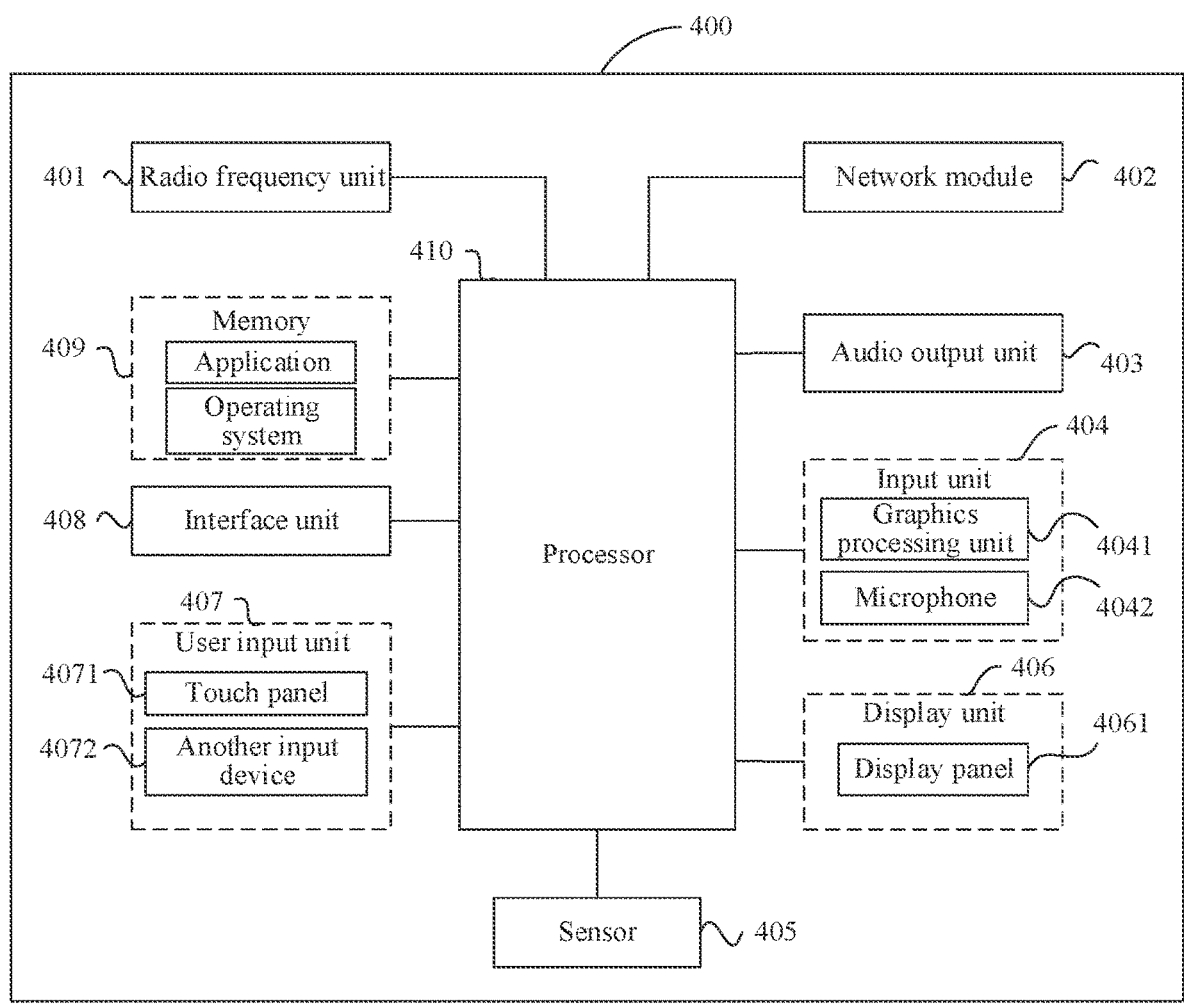
FIG. 6 is a second schematic structural diagram of an electronic device according to an embodiment of this application.

FIG. 6 is a schematic diagram of a hardware structure of an electronic device for implementing the embodiments of this application.

The electronic device 400 includes, but is not limited to: components such as a radio frequency unit 401, a network module 402, an audio output unit 403, an input unit 404, a sensor 405, a display unit 406, a user input unit 407, an interface unit 408, a memory 409, and a processor 410.

A person skilled in the art may understand that, the electronic device 400 may further include a power supply (such as a battery) for supplying power to the components. The power supply may be logically connected to the processor 410 by using a power supply management system, thereby implementing functions, such as charging, discharging, and power consumption management, by using the power supply management system. The structure of the electronic device shown in FIG. 6 constitutes no limitation on the electronic device, and the electronic device may include more or fewer components than those shown in the figure, or some components may be combined, or a different component deployment may be used. This is not described herein again.

The user input unit 407 is configured to: receive a first input.
    the processor 410 is configured to: start first photographing in response to the first input.
    the user input unit 407 is further configured to: receive a second input; and
    the processor 410 is further configured to: in response to the second input, start second photographing in a case that it is determined that a photographing application obtains target image data of the first photographing from an operating system, and process the target image data by using a first preset algorithm, to obtain a first processing result, where the target image data is initial image data outputted through a sensor of a camera, or is image data outputted after format conversion is performed on the initial image data, and the first preset algorithm is an algorithm corresponding to the target image data; and
    perform encoding based on the first processing result to obtain a first photographic image.

In this embodiment of this application, the user input unit 407 receives a first input; the processor 410 starts first photographing in response to the first input; the user input unit 407 receives a second input; the processor 410, in response to the second input, starts second photographing in a case that it is determined that a photographing application obtains target image data of the first photographing from an operating system, and processes the target image data by using a first preset algorithm, to obtain a first processing result, where the target image data is initial image data outputted through a sensor of a camera, or is image data outputted after format conversion is performed on the initial image data, and the first preset algorithm is an algorithm corresponding to the target image data; and performs encoding based on the first processing result to obtain a first photographic image. In this way, during photographing, next photographing can be performed after the target image data is obtained. There is no need to wait for the photographic image to be encoded before performing next photographing, thereby reducing the possibility of missing capturing a to-be-photographed picture, and improving the photographing effect.

In some embodiments, the processor 410 is further configured to: determine whether the first preset algorithm needs to be used in a process of obtaining a final photographic image; and
    the processor 410 is further configured to; in a case that the first preset algorithm needs to be used in the process of obtaining the final photographic image, start the second photographing in a case that it is determined that the photographing application obtains the target image data of the first photographing from the operating system, and process the target image data by using the first preset algorithm.

In some embodiments, the processor 410 is further configured to:
    in a case that the first preset algorithm does not need to be used in the process of obtaining the final photographic image, start the second photographing in a case that it is determined that the photographing application obtains a second photographic image of the first photographing from the operating system, where
    the second photographic image is an image obtained by encoding the target image data.

In some embodiments, the target image data is the initial image data outputted through the sensor of the camera, and the processor 410 is further configured to:
    input the first processing result into a graphics processing unit to obtain image data outputted by the graphics processing unit, and
    perform encoding based on the image data outputted by the graphics processing unit to obtain the first photographic image.

In some embodiments, the target image data is the image data outputted after format conversion is performed on the initial image data, and the processor 410 is further configured to:
    determine whether a second preset algorithm needs to be used in the process of obtaining the final photographic image;

in a case that the second preset algorithm needs to be used in the process of obtaining the final photographic image, start the second photographing in a case that it is determined that the photographing application obtains the initial image data from the operating system, and process the initial image data by using the second preset algorithm, to obtain a second processing result;

perform format conversion on the second processing result to obtain second image data; and perform encoding based on the second image data to obtain a third photographic image; and the processor 410 is further configured to:

determine whether the first preset algorithm needs to be used in the process of obtaining the final photographic image in a case that the second preset algorithm does not need to be used in the process of obtaining the final photographic image.

It should be understood that, in this embodiment of this application, the input unit 404 may include a Graphics Processing Unit (GPU) 4041 and a microphone 4042. The graphics processing unit 4041 processes image data of a static picture or a video that is obtained by an image capture device (for example, a camera) in a video capture mode or an image capture mode. The display unit 406 may include a display panel 4061. The display panel 4061 may be configured by using a liquid crystal display, an organic light-emitting diode, or the like. The user input unit 407 includes a touch panel 4071 and another input device 4072. The touch panel 4071 is also referred to as a touchscreen. The touch panel 4071 may include two parts: a touch detection apparatus and a touch controller. The another input device 4072 may include, but not limited to, a physical keyboard, a functional key (such as a volume control key or a switch key), a track ball, a mouse, and a joystick, which is not described herein in detail. The memory 409 may be configured to store a software program and various data, including, but not limited to, an application and an operating system. The processor 410 may integrate an application processor and a modem. The application processor mainly processes an operating system, a user interface, an application, and the like. The modem mainly processes wireless communication. It may be understood that the modem may not be integrated into the processor 410.

An embodiment of this application further provides a readable storage medium, storing a program or an instruction, where the program or the instruction, when executed by a processor, implements the processes of the foregoing photographing method embodiment, and can achieve the same technical effects. To avoid repetition, details are not described herein again.

The processor is the processor in the electronic device described in the foregoing embodiment. The readable storage medium includes a computer-readable storage medium, for example, a Read-Only Memory (ROM), a Random Access Memory (RAM), a magnetic disk, or an optical disc.

An embodiment of this application further provides a chip, including a processor and a communication interface, where the communication interface is coupled to the processor, and the processor is configured to execute a program or an instruction, to implement the processes of the foregoing photographing method embodiment, and can achieve the same technical effects. To avoid repetition, details are not described herein again.

It should be understood that, the chip mentioned in this embodiment of this application may also be referred to as a system-level chip, a system chip, a chip system, a system on chip, or the like.

It should be noted that, in this specification, terms "comprise", "include", and any variants thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Without more limitations, elements defined by the sentence "comprising one" does not exclude that there are still other same elements in the processes, methods, objects, or apparatuses. In addition, it should be noted that, the scope of the method and apparatus in the embodiments of this application is not limited to performing the functions in the order shown or discussed, but may also include performing the functions in a substantially simultaneous manner or in a reverse order according to the functions involved. For example, the described method may be performed in an order different from the described order, and various steps may also be added, omitted, or combined. In addition, features described with reference to certain examples may be combined in other examples.

Through the foregoing description on the implementations, a person skilled in the art can clearly learn that the foregoing embodiment methods may be implemented by using software in combination with a necessary universal hardware platform. The embodiment methods may also be implemented by using hardware, but the former is a better implementation in many cases. Based on such an understanding, the technical solutions of this application essentially or the part contributing to the related art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, a network device, or the like) to perform the methods described in the embodiments of this application.

The embodiments of this application have been described above with reference to the accompanying drawings. This application is not limited to the specific embodiments described above, and the specific embodiments described above are merely exemplary and not limitative. Those of ordinary skill in the art may make various variations under the teaching of this application without departing from the purpose of this application and the protection scope of the claims, and such variations shall all fall within the protection scope of this application.

What is claimed is:

1. A photographing method, comprising:

receiving a first input;

starting first photographing in response to the first input;

determining whether a first preset algorithm needs to be used in a process of obtaining a final photographic image;

receiving a second input;

in response to the second input, starting second photographing upon determining that a photographing application obtains target image data of the first photographing from an operating system, and processing the target image data by using the first preset algorithm, to obtain a first processing result, wherein the target image data is initial image data outputted through a sensor of a camera, or the target image data is image data outputted after format conversion is performed on the initial image data, wherein the first preset algorithm is an algorithm corresponding to the target image data; and performing encoding based on the first processing result to obtain a first photographic image, wherein the starting second photographing upon determining that a photographing application obtains target image data of the first photographing from an operating system, and processing the target image data by using a first preset algorithm comprises:

when the first preset algorithm needs to be used in the process of obtaining the final photographic image, starting the second photographing upon determining that the photographing application obtains the target image data of the first photographing from the operating system, and processing the target image data by using the first preset algorithm, when the first preset algorithm does not need to be used in the process of obtaining the final photographic image, starting the second photographing upon determining that the photographing application obtains a second photographic image of the first photographing from the operating system, wherein the second photographic image is an image obtained by encoding the target image data.

2. The photographing method according to claim 1, wherein the target image data is the initial image data outputted through the sensor of the camera, and after the starting second photographing, the performing encoding based on the first processing result to obtain a first photographic image comprises:

inputting the first processing result into a graphics processing unit to obtain image data outputted by the graphics processing unit; and performing encoding based on the image data outputted by the graphics processing unit to obtain the first photographic image.

3. The photographing method according to claim 1, wherein:

the target image data is the image data outputted after the format conversion is performed on the initial image data, and after the starting first photographing and before the determining whether the first preset algorithm needs to be used in a process of obtaining a final photographic image, the method further comprises:

determining whether a second preset algorithm needs to be used in the process of obtaining the final photographic image;

when the second preset algorithm needs to be used in the process of obtaining the final photographic image, starting the second photographing upon determining that the photographing application obtains the initial image data from the operating system, and processing the initial image data by using the second preset algorithm, to obtain a second processing result;

performing format conversion on the second processing result to obtain second image data; and performing encoding based on the second image data to obtain a third photographic image, and wherein:

the determining whether the first preset algorithm needs to be used in a process of obtaining a final photographic image comprises:

determining whether the first preset algorithm needs to be used in the process of obtaining the final photographic image when the second preset algorithm does not need to be used in the process of obtaining the final photographic image.

4. A chip, comprising a processor and a communication interface coupled to the processor, wherein the processor is configured to execute a computer program or an instruction to perform the photographing method according to claim 1.

5. The chip according to claim 4, wherein the target image data is the initial image data outputted through the sensor of the camera, and after the starting second photographing, the performing encoding based on the first processing result to obtain a first photographic image comprises:

inputting the first processing result into a graphics processing unit to obtain image data outputted by the graphics processing unit; and performing encoding based on the image data outputted by the graphics processing unit to obtain the first photographic image.

6. The chip according to claim 4, wherein:

the target image data is the image data outputted after the format conversion is performed on the initial image data, and after the starting first photographing and before the determining whether the first preset algorithm needs to be used in a process of obtaining a final photographic image, the method further comprises:

determining whether a second preset algorithm needs to be used in the process of obtaining the final photographic image;

when the second preset algorithm needs to be used in the process of obtaining the final photographic image, starting the second photographing upon determining that the photographing application obtains the initial image data from the operating system, and processing the initial image data by using the second preset algorithm, to obtain a second processing result;

performing format conversion on the second processing result to obtain second image data; and performing encoding based on the second image data to obtain a third photographic image, and wherein:

the determining whether the first preset algorithm needs to be used in a process of obtaining a final photographic image comprises:

determining whether the first preset algorithm needs to be used in the process of obtaining the final photographic image when the second preset algorithm does not need to be used in the process of obtaining the final photographic image.

7. An electronic device, comprising a processor; and a memory having a computer program or an instruction stored thereon, wherein the program or the instruction, when executed by the processor, causes the processor to perform operations comprising:

receiving a first input;

starting first photographing in response to the first input;

determining whether a first preset algorithm needs to be used in a process of obtaining a final photographic image;

receiving a second input;

in response to the second input, starting second photographing upon determining that a photographing application obtains target image data of the first photographing from an operating system, and processing the target image data by using the first preset algorithm, to obtain a first processing result, wherein the target image data is initial image data outputted through a sensor of a camera, or the target image data is image data outputted after format conversion is performed on the initial image data, wherein the first preset algorithm is an algorithm corresponding to the target image data; and performing encoding based on the first processing result to obtain a first photographic image, wherein the starting second photographing upon determining that a photographing application obtains target image data of the first photographing from an operating system, and processing the target image data by using a first preset algorithm comprises:

when the first preset algorithm needs to be used in the process of obtaining the final photographic image, starting the second photographing upon determining that the photographing application obtains the target image data of the first photographing from the operating system, and processing the target image data by using the first preset algorithm, when the first preset algorithm does not need to be used in the process of obtaining the final photographic image, starting the second photographing upon determining that the photographing application obtains a second photographic image of the first photographing from the operating system, wherein the second photographic image is an image obtained by encoding the target image data.

8. The electronic device according to claim 7, wherein the target image data is the initial image data outputted through the sensor of the camera, and after the starting second photographing, the performing encoding based on the first processing result to obtain a first photographic image comprises:

inputting the first processing result into a graphics processing unit to obtain image data outputted by the graphics processing unit; and performing encoding based on the image data outputted by the graphics processing unit to obtain the first photographic image.

9. The electronic device according to claim 4, wherein:

the target image data is the image data outputted after the format conversion is performed on the initial image data, and after the starting first photographing and before the determining whether the first preset algorithm needs to be used in a process of obtaining a final photographic image, the operations further comprise:

determining whether a second preset algorithm needs to be used in the process of obtaining the final photographic image;

when the second preset algorithm needs to be used in the process of obtaining the final photographic image, starting the second photographing upon determining that the photographing application obtains the initial image data from the operating system, and processing the initial image data by using the second preset algorithm, to obtain a second processing result;

performing format conversion on the second processing result to obtain second image data; and performing encoding based on the second image data to obtain a third photographic image, and wherein:

the determining whether the first preset algorithm needs to be used in a process of obtaining a final photographic image comprises:

determining whether the first preset algorithm needs to be used in the process of obtaining the final photographic image when the second preset algorithm does not need to be used in the process of obtaining the final photographic image.

10. A non-transitory computer-readable storage medium, storing a computer program or an instruction that, when executed by a processor, causes the processor to perform operations comprising:

receiving a first input;

starting first photographing in response to the first input;

determining whether a first preset algorithm needs to be used in a process of obtaining a final photographic image;

receiving a second input;

in response to the second input, starting second photographing upon determining that a photographing application obtains target image data of the first photographing from an operating system, and processing the target image data by using the first preset algorithm, to obtain a first processing result, wherein the target image data is initial image data outputted through a sensor of a camera, or the target image data is image data outputted after format conversion is performed on the initial image data, wherein the first preset algorithm is an algorithm corresponding to the target image data; and performing encoding based on the first processing result to obtain a first photographic image, wherein the starting second photographing upon determining that a photographing application obtains target image data of the first photographing from an operating system, and processing the target image data by using a first preset algorithm comprises:

when the first preset algorithm needs to be used in the process of obtaining the final photographic image, starting the second photographing upon determining that the photographing application obtains the target image data of the first photographing from the operating system, and processing the target image data by using the first preset algorithm, when the first preset algorithm does not need to be used in the process of obtaining the final photographic image, starting the second photographing upon determining that the photographing application obtains a second photographic image of the first photographing from the operating system, wherein the second photographic image is an image obtained by encoding the target image data.

11. The non-transitory computer-readable storage medium according to claim 10, wherein the target image data is the initial image data outputted through the sensor of the camera, and after the starting second photographing, the performing encoding based on the first processing result to obtain a first photographic image comprises:

inputting the first processing result into a graphics processing unit to obtain image data outputted by the graphics processing unit; and performing encoding based on the image data outputted by the graphics processing unit to obtain the first photographic image.

12. The non-transitory computer-readable storage medium according to claim 10, wherein:

the target image data is the image data outputted after the format conversion is performed on the initial image data, and after the starting first photographing and before the determining whether the first preset algorithm needs to be used in a process of obtaining a final photographic image, the operations further comprise:

determining whether a second preset algorithm needs to be used in the process of obtaining the final photographic image;

when the second preset algorithm needs to be used in the process of obtaining the final photographic image, starting the second photographing upon determining that the photographing application obtains the initial image data from the operating system, and processing the initial image data by using the second preset algorithm, to obtain a second processing result;

performing format conversion on the second processing result to obtain second image data; and performing encoding based on the second image data to obtain a third photographic image, and wherein:

the determining whether the first preset algorithm needs to be used in a process of obtaining a final photographic image comprises:

determining whether the first preset algorithm needs to be used in the process of obtaining the final photographic image when the second preset algorithm does not need to be used in the process of obtaining the final photographic image.

\* \* \* \* \*